(No Model.)
J. J. CLARET.
ROTARY LIQUID METER.
No. 426,919. Patented Apr. 29, 1890.
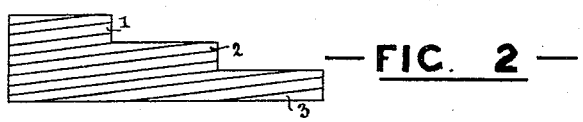
— FIG. 2 —
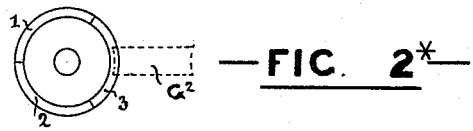
— FIG. 2* —
— FIG. 3 —
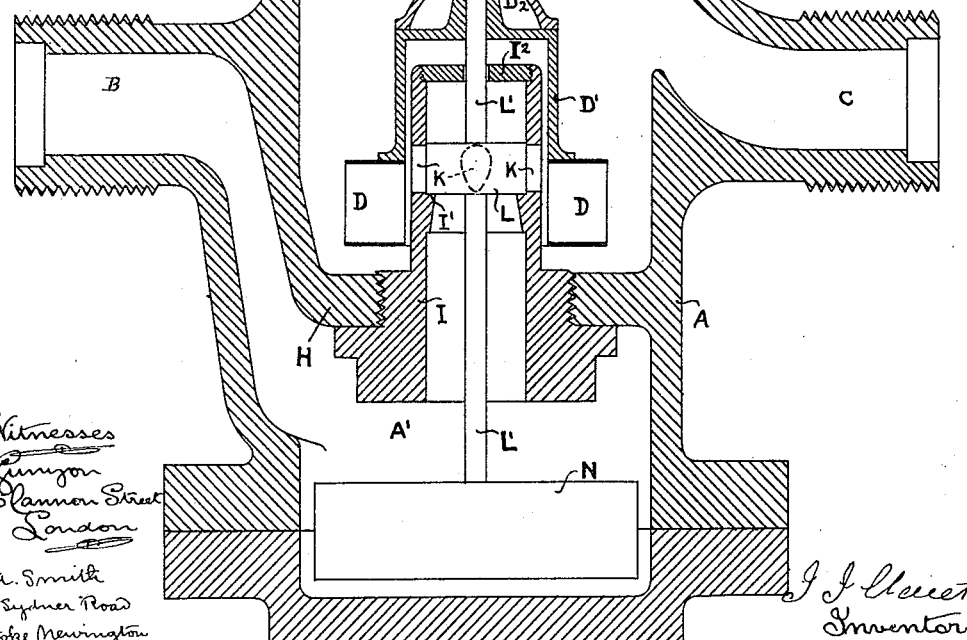
— FIG. 1 —

UNITED STATES PATENT OFFICE.

JOHN JAMES CLARET, OF TOTTENHAM, COUNTY OF MIDDLESEX, ENGLAND.

ROTARY LIQUID-METER.

SPECIFICATION forming part of Letters Patent No. 426,919, dated April 29, 1890.

Application filed November 26, 1889. Serial No. 331,616. (No model.)

*To all whom it may concern:*

Be it known that I, JOHN JAMES CLARET, engineer, a subject of the Queen of Great Britain, and residing at 61 Templeton Road, West Green Road, Tottenham, in the county of Middlesex and Kingdom of Great Britain, have invented certain new and useful Improvements in Liquid-Meters, of which the following is a specification.

This invention relates to improvements in that class of liquid-meters known as "inferential," in which the measurement of the quantity of liquid passing through the meter is made by the revolutions of a fan, paddle-wheel, or turbine set in rotary motion by such liquid, and more especially to that variety of such meters in which the entering liquid is caused to raise a weighted piston, plunger, or valve, which as it rises uncovers or opens the inlet-passages that conduct the liquid to the fan—as, for example, in meters of the kind for which a patent was granted to me in England, dated February 14, 1888, No. 2,243.

I have found that when small quantities of liquid are passing through meters of this latter kind the measuring-fan runs faster in proportion than when considerable quantities are passing, so that although a given meter may register correctly, or nearly so, when the maximum quantity of liquid is passing through it in a given time it will register too large a quantity when a smaller quantity is passing, and this error increases in proportion as the quantity actually passing decreases.

The object of my present invention is to provide means for correcting or neutralizing this tendency to register too fast when small quantities of liquid are passing. For this purpose I employ the arrangement shown in the accompanying sheet of drawings, in which—

Figure 1 is a vertical sectional elevation of a meter constructed with my improvements applied thereto; and Fig. 2 is a development of the cylindrical surface of the worm G', shown in Fig. 1. Fig. 2× is an end or top view of the worm. Fig. 3 is a development of another form of worm.

A is the body of the meter; B, the inlet-passage; C, the outlet-passage; D, the measuring-fan, paddle-wheel, or turbine, the spindle E of which passes upward through the bottom F of the register-chamber G and carries at its upper end a worm G', which gives motion to the worm-wheel $G^2$, that drives the registering-train in the usual way. This worm G' will be more particularly described hereinafter.

H is a partition in the body A of the meter, separating the inlet-passage B from the outlet-passage C.

I is a pipe or cylinder screwed into or otherwise secured in the partition H. The upper end of this pipe or cylinder passes up into the interior of the fan or turbine D, and is furnished with lateral inlet openings or ports K.

L is a piston fitted to slide easily up and down in the pipe or cylinder I, but resting on the seating I' when in its lowest position. The piston L is carried on a rod L', the lower end of which carries a weight N.

The arrangements thus far described are practically the same as those described and shown in the specification of my aforesaid English patent, and I have repeated the description here merely for the purpose of making more easily understood the devices now to be described. The fan or turbine D is carried by a cylindrical piece D', connected to the spindle E, the lower end of which rests and rotates on the toe-piece $D^2$, formed on or secured to the upper end of the piston-rod L', which passes up through a guide $I^2$, secured to the upper end of the pipe or cylinder I. The fan or turbine D and the worm G', secured on the upper end of its spindle E, being thus connected to the piston-rod L', follow the up and down movements of the piston L. This worm G' is, in the example shown, formed of a three-threaded screw, the cylindrical surface of which is shown developed in Fig. 2. The lowermost one-third of these threads (marked 3) is alone left complete, the next third higher (marked 2) is cut away to the extent of one-third (more or less) of its circumference, and the next or highest third (marked 1) is cut away to the extent of two-thirds (more or less) of its circumference. It will now be understood that any liquid passing through the meter enters the chamber A' by the passage B, and, passing up the interior of the pipe or cylinder I, exerts a pressure upon the under side of the piston L, which causes the latter to rise in opposition to the action of the weight N. This uncovers the ports K more or less and allows the liquid to pass through them and to impinge upon the vanes of the fan or turbine D, so as to set it in rotary motion, and then, after escaping at the circumference of the said turbine, the said liquid passes away through the outlet-passage C. The greater the quantity of liquid entering at B the higher the piston L rises and the larger the area of the passage-ways through the ports K becomes. On the other hand, if the quantity of liquid decreases, the weight N draws down the piston L and the area of the passage-ways through the ports K is proportionally reduced. When the maximum quantity of liquid is passing through the meter, the piston L is raised to its highest position, and consequently the worm G' is also similarly raised, and the lower part of its threads—that is, the portion which remains complete and is marked 3 in Fig. 2—comes into gear with the worm-wheel $G^2$, and it will be obvious that that part of the worm G' will, so long as the maximum flow, or thereabout, is passing, continue to turn the worm-wheel $G^2$ during the whole of each revolution of the fan-spindle E—that is to say, each complete revolution of the spindle E and worm G' will move the worm-wheel $G^2$ forward three teeth, thereby moving forward the registering-indices to an extent corresponding to the quantity of water actually passing, or thereabout. If now the quantity of liquid passing is reduced so that the meter would, under ordinary circumstances, register too fast, the corresponding fall of the piston L will allow the fan D to fall also, and with it the worm G', so as to bring that part of the threads of the latter marked 2, and which have been cut away to the extent of one-third, more or less, opposite to the worm-wheel $G^2$, and it will be obvious that so long as the worm G' remains in that position relative to the worm-wheel $G^2$ it will only gear with the teeth of the latter during about two-thirds of its own revolution. Consequently one complete revolution of the worm G' will only pass two teeth of the worm-wheel $G^2$, instead of three, as before. Thus the comparative acceleration of the fan D, due to the reduction of the quantity of liquid passing, is compensated or neutralized by the reduction of the turning effect of the worm G' on the worm-wheel $G^2$ and the consequent and proportional reduction in the movement of the registering-indices. If the quantity of liquid is still further reduced, so that the meter would, under ordinary circumstances, register still faster in proportion, the piston L falls still farther, and with it the fan D and worm G', so as to bring that third part of the threads of the latter marked 1, and which have been cut away to the extent of two-thirds, more or less, opposite to the worm-wheel $G^2$, so that the worm will only act during about one-third of its revolution on the worm-wheel $G^2$, and will therefore only turn the latter to the extent of about one tooth for each revolution of the worm, instead of two, as in the last case, and the still further comparative acceleration of the fan D, due to the greater reduction of the quantity passing, is again compensated or neutralized by the proportionate reduction of the turning effect of the worm G' on the worm-wheel $G^2$ and the consequent proportionate reduction in the movement of the registering-indices.

I have described the worm G' as consisting of a triple-threaded screw divided into three parts, each about one-third less in length circumferentially than the one below it; but it will be understood that the worm may be made as a screw of two, four, five, six, or any other number of threads divided into a corresponding number of parts, each part less in length circumferentially than the one below it, and that the greater the number of threads the greater the accuracy attainable, because the difference of the effect of one part of the screw-threads on the worm-wheel as compared with that of the part next to it is less the greater the number of threads; but the number of threads, and therefore the number of different lengths of threads, in a given worm is practically limited by considerations, first, of the height to which the fan can be lifted; secondly, of the size of the worm-wheel $G^2$, which has to be made smaller in proportion as the number of threads increase, in order to prevent it from being acted on by a longer length of thread than is intended, and, thirdly, of the pitch of the teeth of the worm-wheel $G^2$, which has to be made smaller the greater the number of threads employed, so that when the worm is formed of a screw with numerous threads the teeth of the worm-wheel become too small for practical use. Fig. 3 shows the development of a four-threaded worm with parts cut away, so as to give threads of four different lengths.

The length of thread left intact at each part of the worm G' should be so regulated that it is just sufficient to give the amount of motion to the worm-wheel $G^2$ that will move the registering-indices a distance corresponding to the quantity of liquid passing when the particular part of the worm is opposite to the worm-wheel.

I claim—

In a liquid-meter in which a piston or other part is caused to rise and fall in proportion to the quantity of liquid passing through such meter, the combination, with such rising and falling piston or other part, of a multiple-threaded worm having parts thereof cut away or removed, so as to present portions of the worm-threads of different lengths to the worm-wheel driving the registering-gear, according as the quantity of liquid passing is greater or less, substantially as hereinbefore described, and for the purpose set forth.

In testimony that I claim the foregoing as my invention I have signed my name in presence of two subscribing witnesses.

JOHN JAMES CLARET.

Witnesses:
S. E. GUNYON,
  115 *Cannon Street, London.*
W. A. SMITH,
  73 *Sydner Road, Stoke Newington.*